United States Patent
Okuno et al.

(10) Patent No.: US 9,786,443 B2
(45) Date of Patent: Oct. 10, 2017

(54) CAPACITOR AND METHOD FOR CHARGING AND DISCHARGING THE SAME

(71) Applicant: Sumitomo Electric Industries, Ltd., Osaka-shi (JP)

(72) Inventors: Kazuki Okuno, Itami (JP); Kenji Takahashi, Itami (JP); Masatoshi Majima, Itami (JP); Shinji Ishikawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 115 days.

(21) Appl. No.: 14/890,350

(22) PCT Filed: Mar. 27, 2014

(86) PCT No.: PCT/JP2014/058803
§ 371 (c)(1),
(2) Date: Nov. 10, 2015

(87) PCT Pub. No.: WO2014/185162
PCT Pub. Date: Nov. 20, 2014

(65) Prior Publication Data
US 2016/0118199 A1    Apr. 28, 2016

(30) Foreign Application Priority Data
May 16, 2013 (JP) .................................. 2013-104289

(51) Int. Cl.
H02J 7/00 (2006.01)
H01G 11/34 (2013.01)
(Continued)

(52) U.S. Cl.
CPC .............. *H01G 11/34* (2013.01); *H01G 11/06* (2013.01); *H01G 11/24* (2013.01); *H01G 11/50* (2013.01); *H02J 7/007* (2013.01); *Y02E 60/13* (2013.01)

(58) Field of Classification Search
USPC .......................... 320/167; 429/231, 233, 245
See application file for complete search history.

(56) References Cited

U.S. PATENT DOCUMENTS

2009/0117094 A1 * 5/2009 Leis .......................... B01J 20/20
424/125
2009/0226797 A1    9/2009 Yoshitake et al.
(Continued)

FOREIGN PATENT DOCUMENTS

JP    2004-513529 A    4/2004
JP    2006-513969 A    4/2006
(Continued)

OTHER PUBLICATIONS

International Search Report in International Application No. PCT/JP2014/058803 dated May 13, 2014.
(Continued)

*Primary Examiner* — Brian Ngo
(74) *Attorney, Agent, or Firm* — Venable LLP; Michael A. Sartori; Miguel A. Lopez

(57) ABSTRACT

Provided is a capacitor in which, even in the case of a high maximum charging voltage, decomposition of the electrolyte can be suppressed and charging and discharging can be performed with stability. The capacitor includes a positive electrode containing a positive-electrode active material, a negative electrode containing a negative-electrode active material, a separator disposed between the positive electrode and the negative electrode, and an electrolyte, wherein the positive-electrode active material contains a porous carbon material, in a volume-based pore size distribution of the
(Continued)

porous carbon material, a cumulative volume of pores having a pore size of 1 nm or less accounts for 85% or more of a total pore volume, the porous carbon material has a crystallite size of 1 to 10 nm, the porous carbon material contains an oxygen-containing functional group, and a content of the oxygen-containing functional group is 3.3 mol % or less.

5 Claims, 3 Drawing Sheets

(51) Int. Cl.
  *H01G 11/06* (2013.01)
  *H01G 11/24* (2013.01)
  *H01G 11/50* (2013.01)

(56) References Cited

U.S. PATENT DOCUMENTS

| | | | | |
|---|---|---|---|---|
| 2010/0276631 A1* | 11/2010 | Mabuchi | ............... | H01M 4/133 252/182.1 |
| 2011/0182000 A1* | 7/2011 | Gadkaree | ............... | H01G 11/24 361/502 |
| 2012/0264022 A1* | 10/2012 | Hosoe | ............... | H01G 9/016 429/245 |
| 2013/0077207 A1 | 3/2013 | Kirschbaum | | |
| 2014/0104754 A1* | 4/2014 | Lipka | ............... | C01B 31/08 361/502 |
| 2014/0113200 A1* | 4/2014 | Seymour | ............... | H01G 11/38 429/231.8 |
| 2014/0325807 A1* | 11/2014 | Anouti | ............... | H01G 11/62 29/25.03 |

FOREIGN PATENT DOCUMENTS

| | | |
|---|---|---|
| JP | 2007-531678 A | 11/2007 |
| JP | 2009-537984 A | 10/2009 |
| JP | 2010-254537 A | 11/2010 |
| WO | WO-03/003395 A1 | 1/2003 |
| WO | WO-2008/123286 A1 | 10/2008 |

OTHER PUBLICATIONS

Extended European Search Report in European Patent Application No. 14797840.7, dated Jun. 22, 2016.

Hu et al, "Porous carbons prepared by using metal-organic framework as the precursor for supercapacitors," Carbon, vol. 48, No. 12, Oct. 1, 2010.

Gogotsi et al., "Nanoporous carbide-derived carbon with tunable pore size," Nature Materials, Nature Publishing Group, vol. 2, Aug. 3, 2003.

* cited by examiner

CAPACITOR AND METHOD FOR CHARGING AND DISCHARGING THE SAME

TECHNICAL FIELD

The present invention relates to a capacitor and a method for charging and discharging the capacitor, more specifically, to an improvement in a positive-electrode active material of a capacitor.

BACKGROUND ART

With a trend of focusing on environmental issues, systems that convert clean energy such as sunlight or wind power into electricity and store the clean energy as electric energy are being intensively developed. Known examples of such storage devices include a lithium ion secondary battery (LIB: lithium ion battery), an electric double layer capacitor (EDLC), and a lithium ion capacitor. Recently, capacitors such as an EDLC and a lithium ion capacitor have been attracting attention because capacitors are excellent in terms of instant charge-discharge characteristics, high-output characteristics, and ease of handling.

Such a capacitor includes a first electrode and a second electrode that individually contain electrode active materials, and an electrolyte. The electrode active materials are carbon materials and the like. For example, an EDLC employs activated carbon as an electrode active material. A lithium ion capacitor employs, as a positive-electrode active material, activated carbon and, as a negative-electrode active material, a carbon material that can be intercalated and deintercalated by lithium ions (Patent Literature 1). In order to increase energy density (or capacitance), it has been studied that a graphite in which a plurality of amorphous portions having an average area of 1.5 $nm^2$ or more are dispersed over (002) planes is used as the positive-electrode active material of a capacitor (Patent Literature 2). It has also been studied that carbon particles having nano-pores are used as the electrode active material of an EDLC (Patent Literature 3).

In general, electrolytes of capacitors are organic solvent solutions (organic electrolytes) containing supporting electrolytes. Examples of organic solvents of the electrolytes include ethylene carbonate (EC), ethyl methyl carbonate (EMC), and diethyl carbonate (DEC) (for example, refer to Patent Literature 2).

CITATION LIST

Patent Literature

PTL 1: International Publication No. 2003/003395 Pamphlet
PTL 2: Japanese Unexamined Patent Application Publication No. 2010-254537
PTL 3: Japanese Unexamined Patent Application Publication (Translation of PCT Application) No. 2004-513529

SUMMARY OF INVENTION

Technical Problem

Capacitors have a drawback of having a lower capacitance than LIBs and the like. An increase in the maximum charging voltage of a capacitor allows an increase in the capacitance. However, in a capacitor employing an organic electrolyte, an increase in the charging voltage results in an increase in the potential of the positive electrode during charging. This causes decomposition of the organic electrolyte by oxidation at the positive electrode. As a result, a large amount of gas is generated, which makes it difficult to perform charging and discharging with stability.

Existing carbon materials used in PTLs 1 to 3 and the like have a high content of organic impurities or have a large number of active sites (functional groups or the like) on the surface thereof. In the case of using such a carbon material as an active material, charging to a high voltage results in aggravation of the decomposition of electrolyte. For this reason, even when the above-described carbon materials are used as positive-electrode active materials, charging to a high maximum voltage is difficult to achieve.

Accordingly, an object of the present invention is to provide a capacitor in which, even in the case of a high maximum charging voltage, decomposition of the electrolyte can be suppressed and charging and discharging can be performed with stability.

Solution to Problem

From the standpoint of those described above, an aspect of the present invention relates to a capacitor including a positive electrode containing a positive-electrode active material, a negative electrode containing a negative-electrode active material, a separator disposed between the positive electrode and the negative electrode, and an electrolyte, wherein the positive-electrode active material contains a porous carbon material, in a volume-based pore size distribution of the porous carbon material, a cumulative volume of pores having a pore size of 1 nm or less accounts for 85% or more of a total pore volume, the porous carbon material has a crystallite size of 1 to 10 nm, the porous carbon material contains an oxygen-containing functional group, and a content of the oxygen-containing functional group is 3.3 mol % or less.

Another aspect of the present invention relates to a method for charging and discharging a lithium ion capacitor, wherein the lithium ion capacitor includes a positive electrode containing a positive-electrode active material, a negative electrode containing a negative-electrode active material, a separator disposed between the positive electrode and the negative electrode, and a lithium-ion-conductive electrolyte, the positive-electrode active material contains a porous carbon material, in a volume-based pore size distribution of the porous carbon material, a cumulative volume of pores having a pore size of 1 nm or less accounts for 85% or more of a total pore volume, the porous carbon material has a crystallite size of 1 to 10 nm, the porous carbon material contains an oxygen-containing functional group, a content of the oxygen-containing functional group is 3.3 mol % or less, and the method includes a step of charging and discharging the lithium ion capacitor with a maximum voltage of 3.9 to 5.2 V.

Still another aspect of the present invention relates to a method for charging and discharging an EDLC, wherein the EDLC includes a positive electrode containing a positive-electrode active material, a negative electrode containing a negative-electrode active material, a separator disposed between the positive electrode and the negative electrode, and an electrolyte, the positive-electrode active material contains a porous carbon material, in a volume-based pore size distribution of the porous carbon material, a cumulative volume of pores having a pore size of 1 nm or less accounts for 85% or more of a total pore volume, the porous carbon material has a crystallite size of 1 to 10 nm, the porous carbon material contains an oxygen-containing functional group, a content of the oxygen-containing functional group is 3.3 mol % or less, and the method includes a step of charging and discharging the EDLC with a maximum voltage of 2.8 to 4.2 V.

Advantageous Effects of Invention

According to the above-described aspects of the present invention, even in the case of a high maximum charging voltage, decomposition of the electrolyte can be suppressed and the capacitor can be charged and discharged with stability.

DESCRIPTION OF EMBODIMENTS

Figure 1:
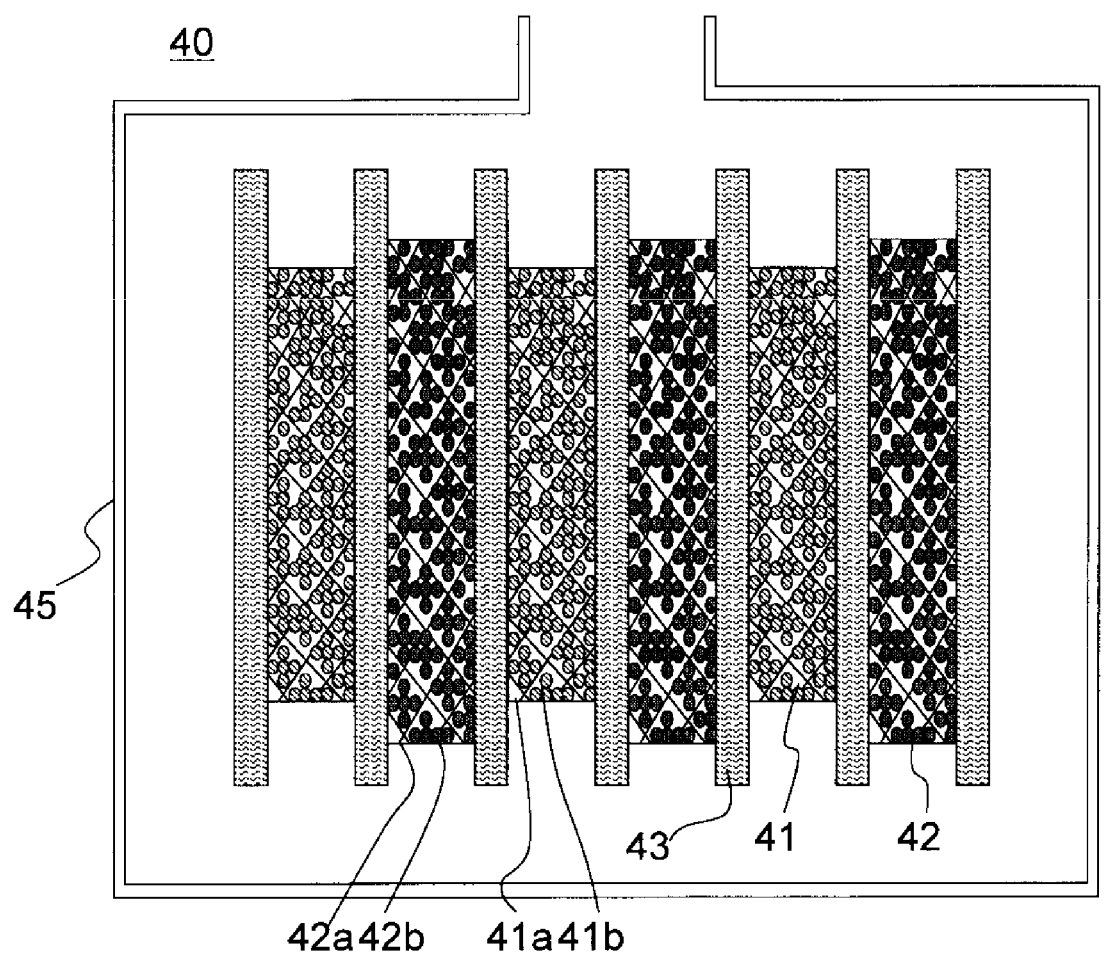
FIG. 1 is a sectional view illustrating the configuration of a capacitor according to an embodiment of the present invention.

Description of Embodiments According to the Present Invention

First, features of embodiments according to the present invention will be listed and described.

An embodiment of the present invention relates to (1) a capacitor including a positive electrode containing a positive-electrode active material, a negative electrode containing a negative-electrode active material, a separator disposed between the positive electrode and the negative electrode, and an electrolyte, wherein the positive-electrode active material contains a porous carbon material, in a volume-based pore size distribution of the porous carbon material, a cumulative volume of pores having a pore size of 1 nm or less accounts for 85% or more of a total pore volume, the porous carbon material has a crystallite size of 1 to 10 nm, the porous carbon material contains an oxygen-containing functional group, and a content of the oxygen-containing functional group is 3.3 mol % or less.

Such a capacitor can be charged and discharged with stability even in the case of setting the maximum charging voltage to be high. An increase in the maximum charging voltage tends to result in decomposition of the electrolyte. However, in the embodiment, decomposition of the electrolyte and the resultant gas generation can be suppressed. Thus, a capacitor that has a high capacitance can be obtained. For example, even when such a lithium ion capacitor is charged to a maximum voltage of 4.2 V or more and such an EDLC is charged to a maximum voltage of 3 V or more, charging and discharging can be performed with stability. Thus, capacitors that have a high capacitance can be obtained.

Note that the crystallite is a crystallite that forms a diamond-like crystal.

(2) The porous carbon material preferably has a monodisperse pore size peak in the volume-based pore size distribution, and the pore size peak is preferably positioned in a range of 0.5 to 0.7 nm. Such a porous carbon material allows charging to a high maximum voltage with stability and allows a high capacitance to be easily achieved.

(3) The negative-electrode active material can contain at least one selected from the group consisting of activated carbon, graphite, hard carbon, soft carbon, lithium titanium oxide, silicon-containing material, and tin-containing material. Since a capacitor according to an embodiment of the present invention can be charged to a high voltage, employment of such a negative-electrode active material for the capacitor allows a further increase in the capacitance of the capacitor.

Another embodiment of the present invention relates to (4) a method for charging and discharging a lithium ion capacitor, wherein the lithium ion capacitor includes a positive electrode containing a positive-electrode active material, a negative electrode containing a negative-electrode active material, a separator disposed between the positive electrode and the negative electrode, and a lithium-ion-conductive electrolyte, the positive-electrode active material contains a porous carbon material, in a volume-based pore size distribution of the porous carbon material, a cumulative volume of pores having a pore size of 1 nm or less accounts for 85% or more of a total pore volume, the porous carbon material has a crystallite size of 1 to 10 nm, the porous carbon material contains an oxygen-containing functional group, a content of the oxygen-containing functional group is 3.3 mol % or less, and the method includes a step of charging and discharging the lithium ion capacitor with a maximum voltage of 3.9 to 5.2 V.

Still another embodiment of the present invention relates to (5) a method for charging and discharging an EDLC, wherein the EDLC includes a positive electrode containing a positive-electrode active material, a negative electrode containing a negative-electrode active material, a separator disposed between the positive electrode and the negative electrode, and an electrolyte, the positive-electrode active material contains a porous carbon material, in a volume-based pore size distribution of the porous carbon material, a cumulative volume of pores having a pore size of 1 nm or less accounts for 85% or more of a total pore volume, the porous carbon material has a crystallite size of 1 to 10 nm, the porous carbon material contains an oxygen-containing functional group, a content of the oxygen-containing functional group is 3.3 mol % or less, and the method includes a step of charging and discharging the EDLC with a maximum voltage of 2.8 to 4.2 V.

In (4) and (5) above, such a porous carbon material is used for the positive-electrode active material so that, even when the maximum charging voltage is high such as 4.2 to 5.2 V (lithium ion capacitor) or 3 to 4.2 V (EDLC), decomposition of the electrolyte and the resultant gas generation are suppressed. Thus, the lithium ion capacitor and the EDLC can be charged and discharged with stability. Accordingly, capacitors that have a high capacitance can be obtained.

Details of Embodiments According to the Present Invention

Specific examples of a capacitor according to an embodiment of the present invention will be described below with appropriately referring to drawings. However, the present invention is not limited to these examples and is indicated by attached Claims. The present invention is intended to embrace all the modifications within the meaning and range of equivalency of the Claims.

A capacitor according to an embodiment of the present invention includes a positive electrode containing a positive-electrode active material, a negative electrode containing a negative-electrode active material, a separator disposed between the positive electrode and the negative electrode, and an electrolyte, wherein the positive-electrode active material contains a porous carbon material; in a volume-based pore size distribution of the porous carbon material, a cumulative volume of pores having a pore size of 1 nm or less accounts for 85% or more of a total pore volume, the porous carbon material has a crystallite size of 1 to 10 nm, the porous carbon material contains an oxygen-containing functional group, and a content of the oxygen-containing functional group is 3.3 mol % or less.

In general, common EDLCs and lithium ion capacitors contain activated carbon as the positive-electrode active material. A positive electrode that contains activated carbon as a positive-electrode active material functions as a positive electrode not by intercalation (or insertion) of anions in the electrolyte into the positive-electrode active material, but by adsorption of the anions onto the surface of the positive electrode. In a case where activated carbon is used for a positive electrode, a cyclic voltammetry (CV) measurement with a counter electrode and a reference electrode that are formed of Li does not provide observation of reversible faradaic capacitance. In other words, use of activated carbon for the positive electrode does not allow the occurrence of intercalation (or insertion) of anions in the electrolyte.

As described above, activated carbon does not allow the occurrence of intercalation (or insertion) of anions in the electrolyte. In addition, activated carbon has a non-uniform pore size distribution. For activated carbon, in order to achieve an increase in the capacitance, the adsorption area of activated carbon needs to be increased. As a result, in the positive electrode, electrons tend to be consumed for a decomposition reaction of the electrolyte and this decomposition causes gas generation. Also, compared with active materials that are intercalated and deintercalated by anions, an increase in the capacitance tends not to be achieved. Furthermore, activated carbon has a high content of organic impurities and hence has various functional groups such as oxygen-containing functional groups on the surface. Such functional groups tend to react with an organic solvent contained in the electrolyte, to cause decomposition and gas generation.

As described above, since activated carbon is not intercalated by anions, use of activated carbon as a positive-electrode active material provides limited contribution to an increase in charging voltage and also does not provide an increase in the capacitance due to intercalation of anions.

In a case where, in order to increase the capacitance of a capacitor, the maximum charging voltage is increased, the potential at the positive electrode increases during charging. Thus, functional groups on the surface of activated carbon function as active sites and the electrolyte is considerably decomposed by oxidation. Also from such a standpoint, a high maximum charging voltage cannot be achieved in a capacitor using activated carbon as a positive-electrode active material. For example, regarding commercially available capacitors, the maximum charging voltage of EDLCs is about 2.7 V and the maximum charging voltage of lithium ion capacitors is about 3.8 V. When such a capacitor is charged to, as a charge cut off voltage, a high voltage beyond such a maximum voltage, the voltage does not increase during the final charging stage or gas generation considerably occurs.

In contrast, when a porous carbon material used in an embodiment of the present invention is used for a positive electrode and the CV measurement is performed in the above-described manner, reversible capacitance is observed. In other words, probably, the porous carbon material can be reversibly intercalated and deintercalated by anions in the electrolyte.

Thus, the porous carbon material is different from activated carbon in an interaction mechanism with anions; and the porous carbon material that has a small surface area in the positive electrode can still provide a capacitance. Also, the contact area with the electrolyte can be reduced so that the decomposition reaction of the electrolyte is probably suppressed and gas generation can be reduced.

In an embodiment of the present invention, a positive-electrode active material containing a porous carbon material that has the above-described pore size distribution and crystallite size is used. Unlike existing carbon materials used as the positive-electrode active material of capacitors such as activated carbon, this porous carbon material has a relatively uniform pore size distribution so that it can be probably intercalated and deintercalated efficiently by anions in the electrolyte.

For this reason, even when charging is carried out to a voltage that is higher than the ordinary maximum charging voltages of commercially available capacitors, decomposition of the electrolyte and the resultant gas generation can be suppressed. In addition, the porous carbon material has a lower content of organic impurities than existing active material such as activated carbon. This also allows suppression of decomposition of the electrolyte and the resultant gas generation.

Thus, in an embodiment of the present invention, even in the case of a high maximum charging voltage, charging and discharging can be performed with stability. Accordingly, a capacitor that has a high capacitance can be obtained. In addition, since gas generation is suppressed, degradation of cycle characteristics of the capacitor can be suppressed and an increase in the internal pressure of the capacitor can also be suppressed.

In a method for charging and discharging a capacitor according to an embodiment of the present invention, even when the capacitor is charged to a voltage that is higher than the maximum charging voltage of common capacitors, the capacitor can be charged and discharged with stability. For example, capacitors can be repeatedly charged and discharged: for an EDLC, with a maximum voltage of more than 2.7 V and, for a lithium ion capacitor, with a maximum voltage of more than 3.8 V. As a result, the capacitance of the positive-electrode active material can be effectively used so that the capacitance of the capacitor can be considerably increased.

The maximum voltage of an EDLC is preferably 2.8 V or more, more preferably 3 V or more or 3.2 V or more, particularly 3.4 V or more. The maximum voltage is, for example, 4.2 V or less, preferably 4 V or less. These minimum values and maximum values can be appropriately selected and combined.

The maximum charging voltage of an EDLC may be 2.8 to 4.2 V, 3 to 4.2 V, or 3.2 to 4 V, for example.

The maximum voltage of a lithium ion capacitor is preferably 3.9 V or more, more preferably 4.2 V or more or more than 4.2 V, still more preferably 4.4 V or more or 4.6 V or more. The maximum voltage is preferably 5.2 V or less, more preferably 5 V or less. These minimum values and maximum values can be appropriately selected and combined. The maximum charging voltage of a lithium ion capacitor may be 3.9 to 5.2 V, 4.2 to 5.2 V, or more than 4.2 V and 5 V or less, for example.

In common EDLCs, activated carbon is also used as the negative-electrode active material. In a case where the above-described porous carbon material is used as the negative-electrode active material, cations are less likely to be adsorbed or inserted than in the existing negative-electrode active material, which tends to result in an insufficient capacitance. On the other hand, the porous carbon material is used as the positive-electrode active material, so that the high capacitance of the porous carbon material can be sufficiently used. Note that, as long as the porous carbon material is used as the positive-electrode active material, even in the case of using the porous carbon material as the negative-electrode active material, charging can be performed to a high voltage and a relatively high capacitance can be ensured.

Hereinafter, the positive electrode and components of a capacitor will be more specifically described. The above-described porous carbon material is suitable as the positive-electrode active material of an EDLC or a lithium ion capacitor, for example. Accordingly, an EDLC and a lithium ion capacitor will be described as examples below. However, the types of capacitors for which the above-described porous carbon material can be used are not particularly limited.

(Positive Electrode)

The positive electrode contains a positive-electrode active material. This positive-electrode active material contains the above-described porous carbon material.

(Porous Carbon Material)

In the volume-based pore size distribution of the porous carbon material, the cumulative volume of pores having a pore size of 1 nm or less accounts for 85% or more of the total pore volume, preferably 87% or more, still more preferably 90% or more.

Unlike activated carbon, the pore size distribution is relatively uniform and charging to a high voltage can be performed with stability. In addition, the content of organic impurities and the content of surface functional groups are low. Accordingly, even in the case of charging to a high voltage, decomposition of the electrolyte can be suppressed and charging and discharging can be performed with stability. Furthermore, most of the pores of the porous carbon material are micro-pores having a size of 1 nm or less and the ratio of meso-pores (pore size of 2 to 50 nm) and macro-pores (pore size of more than 50 nm) is low. Thus, the porous carbon material has a smaller specific surface area than activated carbon. However, the porous carbon material can be intercalated and deintercalated by electrolyte ions so that a positive electrode having a large capacitance can be obtained.

In a case where the cumulative volume of pores having a pore size of 1 nm or less accounts for less than 85% of the total pore volume, a high maximum charging voltage makes it difficult to perform charging and discharging with stability. The reason for this is not known. In addition, since the number of sites that can be intercalated and deintercalated by electrolyte ions decreases, the capacitance tends to be low. Accordingly, an increase in the capacitance of a capacitor is difficult to achieve.

In general, activated carbon has polydisperse pore size peaks in the volume-based pore size distribution, or has a single pore size peak but has a broad pore size distribution. In addition, most of commercially available activated carbons for capacitor electrodes have peaks at more than 0.9 nm (preferably 0.7 nm) in the volume-based pore size distributions.

As described above, the porous carbon material used in an embodiment of the present invention has a relatively uniform pore size distribution. Accordingly, the porous carbon material can have a monodisperse pore size peak in the volume-based pore size distribution.

In addition, the pore size peak in the volume-based pore size distribution is positioned at a small value, for example, 0.9 nm or less, preferably 0.7 nm or less, more preferably 0.65 nm or less. The pore size peak is positioned at, for example, 0.4 nm or more, preferably 0.45 nm or more, still more preferably 0.5 nm or more. These maximum values and minimum values can be appropriately selected and combined. The pore size peak may be positioned in, for example, 0.4 to 0.9 nm or 0.5 to 0.7 nm. In a case where the pore size peak is in such a range, a high cumulative volume of pores having a pore size of 1 nm or less tends to be achieved.

An X-ray diffraction pattern of the porous carbon material obtained with Cuk$\alpha$ radiation has a peak: $P_k$ in $2\theta$=about 40° to about 50°. $P_k$ contains the component of a peak: $P_{d111}$ attributed to the (111) plane of a diamond crystal. In this case, the entire component of $P_k$ may be the component attributed to the (111) plane of a diamond crystal. In other words, the relationship of $P_k=P_{d111}$ may be satisfied.

The porous carbon material having $P_{d111}$ probably has at least partially a diamond-like crystal structure; however, the inherent characteristics of a diamond crystal are suppressed. Accordingly, while the porous carbon material exhibits high electron conductivity, it has higher isotropy of electron conductivity than graphite, for example. Accordingly, the difference in electric resistance depending on plane orientations is small, and a capacitor having a higher current-collecting capability can be obtained. In addition, the porous carbon material whose X-ray diffraction pattern has $P_{d111}$ can maintain its mechanical strength for a long period of time even in the case of having a very large specific surface area, which tends to provide a capacitor that has a high capacitance and is excellent in terms of cycle characteristics.

In a case where the porous carbon material contains a graphite component, a peak: $P_{G010}$ attributed to the (010) plane of graphite appears in $2\theta$=about 40° to about 50°, which is also the range where $P_{d111}$ appears. In this case, a peak: $P_{G002}$ attributed to the (002) plane of graphite is also observed in $2\theta$=about 20° to about 30°.

In the above-described case where the X-ray diffraction pattern obtained with Cuk$\alpha$ radiation has the peak: $P_{G002}$ attributed to the (002) plane of graphite, $P_k$ in $2\theta$=about 40° to about 50° may be a peak that is a combination of $P_{G010}$ and $P_{d111}$. In such a case, by setting a ratio $I_{G002}/I_k$ of the intensity $I_{G002}$ of $P_{G002}$ to the intensity $I_k$ of $P_k$ to be, for example, 3.0 or less, $I_k$ is very high relative to $I_{G002}$ and hence $P_k$ can at least contain the component of $P_{d111}$.

$I_{G002}/I_k$ is preferably 3.0 or less, more preferably 2.5 or less. In a case where such a peak intensity ratio is satisfied, even when the porous carbon material contains a graphite component, ordinary properties of graphite are not substantially exhibited and properties based on the diamond-like crystal structure are strongly exhibited. Incidentally, the intensity (I) of each peak corresponds to the height from the base line in the X-ray diffraction pattern.

The crystallite size determined from the half width of $P_k$ is 1 to 10 nm. In a case where the crystallite size is more than 10 nm, the diamond-like properties of the porous carbon material tend to be strongly exhibited and the pores tend to have large depths, which are disadvantageous in achieving an increase in the capacitance. From the standpoint of easily achieving a high capacitance, the crystallite size is preferably 1 to 5 nm, more preferably 1 to 3 nm. The crystallite structure can be determined by observation of a section of the porous carbon material with an electron microscope.

In summary, unlike graphite, the porous carbon material does not have a highly developed crystal structure, but it is not completely amorphous and has crystallites (carbon micro-crystals) having a size of 1 to 10 nm.

Incidentally, the presence of the peak $P_{d111}$, which is attributed to the (111) plane of a diamond crystal, in the porous carbon material does not necessarily indicate the presence of diamond crystals. However, the presence of the peak $P_{d111}$ at least indicates the presence of a diamond-like crystal structure.

In a case where the porous carbon material has a surface functional group, the surface functional group may serve as an active site to cause decomposition of the electrolyte. The surface functional group is a functional group that may be present on the surface of the porous carbon material. The surface-functional-group content of the porous carbon material is difficult to reduce to 0. However, in an embodiment of the present invention, the porous carbon material preferably has a low content of a functional group that causes decomposition of the electrolyte.

Examples of the surface functional group include oxygen-containing functional groups such as a carbonyl group, a carboxyl group, a hydroxyl group, and an ether group, and hydrocarbon groups such as alkyl groups. These functional groups are often contained in organic impurities.

Among the surface functional groups, in particular, oxygen-containing functional groups tend to serve as sites that cause a side reaction with the electrolyte. Gas generation within the capacitor hampers an increase in the maximum charging voltage and also causes degradation of the cycle characteristics of the capacitor.

In a porous carbon material according to an embodiment of the present invention, the content of oxygen-containing functional groups is 3.3 mol % or less. The content of oxygen-containing functional groups is preferably 3 mol % or less, more preferably 2.5 mol % or less or 2 mol % or less. The content of oxygen-containing functional groups may be 0.1 mol % or more, for example. In a case where the content of oxygen-containing functional groups is more than 3.3 mol %, decomposition of the electrolyte tends to occur considerably. In particular, with an increase in the maximum charging voltage, decomposition of the electrolyte and the resultant gas generation occur considerably.

Activated carbon sometimes contains, as impurities, metal elements such as alkali metal elements (such as lithium, sodium, potassium, and cesium) and transition metal elements. Such impurities cause, in capacitors, internal short circuits, degradation of cycle characteristics, and gas generation resulting in an increase in the internal pressure, for example. For this reason, the content of impurities is desirably low. Alkali metal elements cause a side reaction during charging, which causes degradation of the cycle characteristics of capacitors. Transition metal elements may cause internal short circuits in capacitors.

On the other hand, in the case of using the porous carbon material, the content (by mass) of alkali metal elements can be set to 400 ppm or less, 100 ppm or less, or 10 ppm or less. Accordingly, degradation of cycle characteristics and occurrence of internal short circuits in the capacitor can be effectively suppressed.

The content (by mass) of transition metal elements in the porous carbon material is preferably 100 ppm or less, more preferably 10 ppm or less. Transition metal elements may be contained in raw material (such as metal carbide) for the porous carbon material; however, by controlling conditions for producing the porous carbon material, the concentration of transition metal elements can be decreased to a sufficiently low value.

The porous carbon material has a BET specific surface area of, for example, 800 $m^2/g$ or more, from the standpoint of ease of production of a high-capacitance positive electrode, preferably 1000 $m^2/g$ or more, more preferably 1100 $m^2/g$ or more, still more preferably 1200 $m^2/g$ or more or 1300 $m^2/g$ or more. The BET specific surface area is, for example, 2500 $m^2/g$ or less, generally 2000 $m^2/g$ or less, or 1800 $m^2/g$ or less, which facilitates the production. These minimum values and maximum values can be appropriately selected and combined. The BET specific surface area is preferably 1000 to 2000 $m^2/g$ or 1100 to 1800 $m^2/g$.

The porous carbon material can be produced by, for example, heating metal carbide at 1000° C. to 1500° C. in an atmosphere containing chlorine gas. By causing the metal carbide to react with chlorine gas, the porous carbon material and metal chloride are produced. In this case, the metal carbide preferably has an average particle size of 0.1 to 100 μm, more preferably an average particle size of 2 to 40 μm.

Incidentally, the average particle size is a particle size (D50) that corresponds to a cumulative volume of 50% in a volume-based particle size distribution. The same applies to other materials below. By using a powder or porous-body metal carbide having an average particle size in such a range, the porous carbon material can be efficiently produced from the metal carbide. In addition, the time required for producing the porous carbon material can be reduced. Incidentally, the porous body is in a state where particles of powder are bonded together by aggregation or sintering.

In order to adjust the crystallite size to facilitate an increase in the capacitance, the type of metal carbide is preferably selected and the heating temperature is preferably adjusted.

Metal carbide, which is used as the raw material, is a material that inherently tends not to contain impurities. For this reason, the resultant porous carbon material has a high purity and the impurity content can be markedly reduced. Such a metal carbide may be, for example, $Al_4C_3$; however, properties derived from the diamond-like crystal structure tend not to be provided. For this reason, the metal carbide is preferably at least one selected from the group consisting of silicon carbide (SiC) and titanium carbide (TiC). By using SiC and/or TiC, the resultant porous carbon material tends to exhibit diamond-like properties. In particular, use of SiC provides a porous carbon material that relatively weakly exhibits properties of graphite and is rather excellent in terms of isotropy of electron conductivity. If necessary, SiC and/or TiC may be combined with another metal carbide (such as $Al_4C_3$, $ThC_2$, $B_4C$, $CaC_2$, $Cr_3C_2$, $Fe_3C$, $UC_2$, WC, or MoC).

The heating can be performed at 1000° C. or more; from the standpoint of facilitation of formation of crystallites having an appropriate size and ease of production of a porous carbon material providing an X-ray diffraction pattern having $P_{d111}$ with Cukα radiation, the heating is preferably performed at 1100° C. or more, in particular, 1200° C. or more.

An excessively high heating temperature tends to cause an increase in the intensity $I_{d111}$ of $P_{d111}$ of the resultant porous carbon material, which tends to result in a large crystallite size. Also, an excessively high heating temperature tends to cause a decrease in the specific surface area. The larger the specific surface area, the larger pore volume tends to be achieved, which is suitable for the positive-electrode active material. For this reason, the heating temperature is preferably 1500° C. or less, more preferably 1400° C. or less.

The heating can be performed under a stream or atmosphere of a gas containing chlorine gas alone. Alternatively, the heating can be performed under a stream or atmosphere of a gas mixture containing chlorine gas and an inert gas (such as $N_2$, He, Ar, Ne, or Xe).

The thus-produced porous carbon material has a sharp pore size distribution in which the cumulative volume of pores having a pore size of 1 nm or less accounts for 85% or more of the total pore volume. Thus, a large specific surface area is obtained, which is advantageous in formation of a space-charge layer. In addition, the size of crystallites contained in the porous carbon material can be adjusted to be in the range of 1 to 10 nm.

(Others)

The positive electrode can contain, in addition to the positive-electrode active material, a collector that holds the positive-electrode active material.

The collector may be metal foil or, from the standpoint of providing a capacitor that has a high capacitance, a porous metal body having a three-dimensional network structure. The positive-electrode collector is preferably formed of a material such as aluminum or aluminum alloy.

The positive electrode is obtained by coating or filling a collector with a slurry containing the positive-electrode active material; subsequently, removing a dispersion medium contained in the slurry; and furthermore optionally rolling the collector holding the positive-electrode active material. The slurry may contain, in addition to the positive-electrode active material, a binder and a conductive aid, for example. Examples of the dispersion medium include organic solvents such as N-methyl-2-pyrrolidone (NMP) and water.

The type of the binder is not particularly limited. Examples of the binder include fluororesins such as polyvinylidene fluoride (PVDF) and polytetrafluoroethylene; chlorine-containing vinyl resins such as polyvinyl chloride; polyolefin resins; rubber polymers such as styrene-butadiene rubber; polyvinylpyrrolidone, polyvinyl alcohol; and cellulose derivatives (such as cellulose ethers) such as carboxymethyl cellulose. The amount of the binder is not particularly limited and may be, for example, 0.5 to 10 parts by mass relative to 100 parts by mass of the electrode active material.

The type of the conductive aid is not particularly limited. Examples of the conductive aid include carbon blacks such as acetylene black and Ketjenblack; and conductive fibers such as carbon fibers. The amount of the conductive aid is not particularly limited and may be, for example, 0.1 to 10 parts by mass relative to 100 parts by mass of the electrode active material.

(Negative Electrode)

The negative electrode can contain, in addition to the negative-electrode active material, a collector that holds the negative-electrode active material. As with the positive-electrode collector, the negative-electrode collector may be, for example, metal foil or a porous metal body having a three-dimensional network structure. The negative-electrode collector may be formed of a material such as copper, copper alloy, nickel, nickel alloy, or stainless steel.

The negative-electrode active material preferably contains, for example, at least one selected from the group consisting of activated carbon, graphite, non-graphitizing carbon (hard carbon), graphitizing carbon (soft carbon), lithium titanium oxide, silicon-containing material, and tin-containing material.

The negative-electrode active material can be appropriately selected depending on the type of the capacitor.

For an EDLC, a material that adsorbs cations in the electrolyte, such as activated carbon, can be used.

The activated carbon may be known activated carbon used for capacitors. Examples of raw materials for the activated carbon include wood; coconut shells; pulp spent liquor; coal or coal-based pitch obtained by pyrolysis of coal; heavy oil or petroleum-based pitch obtained by pyrolysis of heavy oil; and phenolic resins.

Such a raw material is carbonized and, in general, the resultant material is activated to provide activated carbon. A method for the activation is, for example, a gas activation method or a reagent activation method. The gas activation method is a method of causing a reaction through contact with water vapor, carbonic acid gas, oxygen, or the like at high temperature to provide activated carbon. The reagent activation method is a method of impregnating such a raw material with a known activation reagent and heating the raw material in an inert gas atmosphere to cause dehydration and oxidation reaction of the activation reagent, to thereby provide activated carbon. Examples of the activation reagent include zinc chloride, sodium hydroxide, and potassium hydroxide. Since activated carbon is produced in such a manner, it contains large amounts of impurities, which is different from the porous carbon material.

The activated carbon is not particularly limited in terms of average particle size (D50); however, D50 is preferably 20 µm or less. Also, the specific surface area is not particularly limited, but it is preferably about 800 to about 3000 m²/g. By satisfying such a range, the capacitance of the capacitor can be increased and the internal resistance can be decreased.

For a lithium ion capacitor, for example, a material that can be intercalated and deintercalated by lithium ions or a material that can form alloy with lithium ions can be used. Examples of the negative-electrode active material used for a lithium ion capacitor include carbon materials that can be intercalated and deintercalated by lithium ions [such as soft carbon, hard carbon, and graphite (such as synthetic graphite and natural graphite)], lithium titanium oxide, silicon-containing material (such as silicon oxide and silicon alloys), and tin-containing material (such as tin oxide and tin alloys). Such negative-electrode active materials may be used alone or in combination of two or more thereof.

The negative-electrode active material of a lithium ion capacitor is preferably a carbon material, in particular, preferably graphite and/or hard carbon.

The negative electrode can be obtained in the same manner as in the positive electrode. The types and amounts of a binder, a conductive aid, and a dispersion medium can be appropriately selected from the examples and ranges for the positive electrode.

For a lithium ion capacitor, in order to decrease the negative-electrode potential, the negative-electrode active material is preferably doped with lithium in advance. This causes an increase in the voltage of the capacitor, which is more advantageous in an increase in the capacitance of the lithium ion capacitor. The doping with lithium is performed during assembly of the capacitor. For example, lithium metal together with a positive electrode, a negative electrode, and a non-aqueous electrolyte are contained within a case of a capacitor; and the assembled capacitor is kept at a temperature of about 60° C. in a thermostatic chamber, so that lithium ions are released from lithium metal foil and are intercalated in the negative-electrode active material. For the lithium doping amount for the negative-electrode active material, the lithium preferably accounts for 5% to 90%, more preferably 10% to 75% of the negative-electrode capacitance (negative-electrode reversible capacitance): $C_n$. In this case, the negative-electrode potential is sufficiently decreased and a high-voltage capacitor is easily obtained.

(Separator)

The separator is permeable to ions and is disposed between the positive electrode and the negative electrode, so that these electrodes are physically separated from each other to prevent short circuits. The separator has a porous structure and holds the electrolyte within the pores to thereby be permeable to ions. Examples of the material of the separator include polyolefins such as polyethylene and polypropylene; polyesters such as polyethylene terephthalate; polyamide; polyimide; cellulose; and glass fibers.

The thickness of the separator is about 10 to about 100 µm, for example.

(Electrolyte)

The electrolyte is not particularly limited as long as it has ion conductivity and can be appropriately selected depending on the type of the capacitor. The electrolyte contains a cation and an anion.

(Cation)

Examples of the cation include inorganic cations and organic cations such as organic onium cations. Examples of the inorganic cations include metal cations such as alkali metal cations (such as a lithium ion, a sodium ion, a potassium ion, a rubidium ion, and a cesium ion), alkaline-earth metal cations (such as a magnesium ion and a calcium ion), and transition metal cations; and an ammonium cation. Examples of the organic onium cations include nitrogen-containing onium cations such as cations derived from aliphatic amines, alicyclic amines, and aromatic amines (such as quaternary ammonium cations) and cations having nitrogen-containing heterocycles (in other words, cations derived from cyclic amines); sulfur-containing onium cations; and phosphorus-containing onium cations. The electrolyte may contain one type of these cations or may contain two or more types of these cations.

Examples of the quaternary ammonium cations include tetraalkylammonium cations such as a tetraethylammonium cation (TEA$^+$) and a triethylmonomethylammonium cation (TEMA$^+$: triethylmethylammonium cation).

Examples of the sulfur-containing onium cations include tertiary sulfonium cations: for example, trialkylsulfonium cations (such as tri $C_{1-10}$ alkyl sulfonium cations) such as a trimethylsulfonium cation, a trihexylsulfonium cation, and a dibutylethylsulfonium cation.

Examples of the phosphorus-containing onium cations include quaternary phosphonium cations: for example, tetraalkylphosphonium cations (such as tetra $C_{1-10}$ alkyl phosphonium cations) such as a tetramethylphosphonium cation, a tetraethylphosphonium cation, and a tetraoctylphosphonium cation; and alkyl(alkoxyalkyl)phosphonium cations (such as tri $C_{1-10}$ alkyl($C_{1-5}$ alkoxy $C_{1-5}$ alkyl)phosphonium cations) such as a triethyl(methoxymethyl)phosphonium cation, a diethylmethyl(methoxymethyl)phosphonium cation, and a trihexyl(methoxyethyl)phosphonium cation. Incidentally, an alkyl(alkoxyalkyl)phosphonium cation has, in total, four groups as the alkyl and alkoxyalkyl groups bonded to the phosphorus atom, and preferably has one or two alkoxyalkyl groups.

Incidentally, the alkyl groups bonded to the nitrogen atom of a quaternary ammonium cation, the sulfur atom of a tertiary sulfonium cation, and the phosphorus atom of a quaternary phosphonium cation each preferably have 1 to 8 carbon atoms, more preferably 1 to 4 carbon atoms, in particular, preferably 1, 2, or 3 carbon atoms.

Examples of the nitrogen-containing heterocycle skeletons of organic onium cations include 5- to 8-membered heterocycles that each have 1 or 2 nitrogen atoms as atoms forming the cycle, such as pyrrolidine, imidazoline, imidazole, pyridine, and piperidine; and 5- to 8-membered heterocycles that each have, as atoms forming the cycle, 1 or 2 nitrogen atoms and another hetero atom (such as an oxygen atom or a sulfur atom), such as morpholine.

Incidentally, such a nitrogen atom serving as an atom forming the cycle may have an organic group such as an alkyl group as a substituent. Examples of the alkyl group include alkyl groups having 1 to 10 carbon atoms such as a methyl group, an ethyl group, a propyl group, and an isopropyl group. The number of the carbon atoms of the alkyl group is preferably 1 to 8, more preferably 1 to 4, in particular, preferably 1, 2, or 3.

Among nitrogen-containing organic onium cations, in particular, preferred are cations having, as the nitrogen-containing heterocycle skeleton, pyrrolidine or imidazoline. Such an organic onium cation having a pyrrolidine skeleton preferably has two alkyl groups selected from the above-described alkyl groups on the single nitrogen atom forming the pyrrolidine ring. Such an organic onium cation having an imidazoline skeleton preferably has one alkyl group selected from the above-described alkyl groups on each of the two nitrogen atoms forming the imidazoline ring.

Specific examples of the organic onium cation having a pyrrolidine skeleton include an N,N-dimethylpyrrolidinium cation, an N,N-diethylpyrrolidinium cation, an N-methyl-N-ethylpyrrolidinium cation, an N-methyl-N-propylpyrrolidinium cation (MPPY$^+$), an N-methyl-N-butylpyrrolidinium cation (MBPY$^+$), and an N-ethyl-N-propylpyrrolidinium cation. Of these, in particular, in view of high electrochemical stability, preferred are pyrrolidinium cations that each have a methyl group and an alkyl group having 2 to 4 carbon atoms, such as MPPY$^+$ and MBPY$^+$.

Specific examples of the organic onium cation having an imidazoline skeleton include a 1,3-dimethylimidazolium cation, a 1-ethyl-3-methylimidazolium cation (EMI$^+$), a 1-methyl-3-propylimidazolium cation, a 1-butyl-3-methylimidazolium cation (BMI$^+$), a 1-ethyl-3-propylimidazolium cation, and a 1-butyl-3-ethylimidazolium cation. Of these, preferred are imidazolium cations that each have a methyl group and an alkyl group having 2 to 4 carbon atoms, such as EMI$^+$ and BMI$^+$.

(Anion)

Examples of the anion contained in the electrolyte include a hydroxide ion, anions of fluorine-containing acids [for example, fluorine-containing phosphate anions such as a hexafluorophosphate ion ($PF_6^-$); fluorine-containing borate anions such as a tetrafluoroborate ion ($BF_4^-$)], anions of chlorine-containing acids [such as a perchlorate ion ($ClO_4^-$)], anions of oxoacids having an oxalate group [for example, an oxalatoborate ion such as a lithium bis(oxalato)borate ion ($B(C_2O_4)_2^-$); and an oxalatophosphate ion such as a lithium tris(oxalato)phosphate ion ($P(C_2O_4)_3^-$)], fluoroalkanesulfonate anions [such as a trifluoromethanesulfonate ion ($CF_3SO_3^-$)], and bissulfonylimide anions (such as a bissulfonylimide anion containing a fluorine atom). The electrolyte may contain one type of these anions or two or more types of these anions.

The types of the cation and anion can be appropriately selected depending on the type of the capacitor, for example.

The electrolyte for an EDLC may be an alkaline electrolyte or a non-aqueous electrolyte. The non-aqueous solvent contained in such a non-aqueous electrolyte tends to be decomposed at the positive electrode during charging to a high voltage. Accordingly, in particular, for an EDLC using a non-aqueous electrolyte, advantages due to use of the porous carbon material are markedly provided.

As the electrolyte for a lithium ion capacitor, a lithium-ion-conductive non-aqueous electrolyte is used.

(Electrolyte for EDLC)

Examples of the alkaline electrolyte used for an EDLC include alkaline aqueous solutions containing alkalis (such as alkali metal hydroxides) such as potassium hydroxide and sodium hydroxide.

Preferred examples of the non-aqueous electrolyte include solutions prepared by dissolving salts containing the above-described cations and the above-described anions in non-aqueous solvents (organic solvents).

The concentration of such a salt in the non-aqueous electrolyte is, for example, 0.3 to 3 mol/L.

Preferred examples of the cations include organic onium cations; in particular, preferred examples include tetraalkylammonium cations and tetraalkylphosphonium cations. From the standpoint of increasing the ion conductivity, preferred examples include tetra $C_{1-4}$ alkyl ammonium cations and tetra $C_{1-4}$ alkyl phosphonium cations; in particular, preferred is TEMA$^+$.

Preferred examples of the anions include anions of fluorine-containing acids such as fluorine-containing borate anions; in particular, preferred is $BF_4^-$.

A specific example of a preferred salt is a salt (TEMABF$_4$) of TEMA$^+$ and $BF_4^-$.

The non-aqueous solvent (organic solvent) used for an EDLC is not particularly limited. From the standpoint of ion conductivity, examples of the solvent include cyclic carbonates such as EC, propylene carbonate, and butylene carbonate; chain carbonates such as dimethyl carbonate, DEC, and EMC; aliphatic carboxylates such as methyl formate, methyl acetate, methyl propionate, and ethyl propionate; lactones such as γ-butyrolactone and γ-valerolactone; chain ethers such as trimethoxymethane, 1,2-dimethoxyethane, 1,2-diethoxyethane, ethoxymethoxyethane, and ethylmonoglyme; cyclic ethers such as tetrahydrofuran, 2-methyltetrahydrofuran, and 1,3-dioxolane; sulfoxides such as dimethyl sulfoxide, sulfolane, and methylsulfolane; amides such as formamide, acetamide, and dimethylformamide; nitriles such as acetonitrile and propiononitrile; nitroalkanes such as nitromethane; and sultones such as 1,3-propanesultone. These non-aqueous solvents may be used alone or in combination of two or more thereof.

(Electrolyte for Lithium Ion Capacitor)

The non-aqueous electrolyte used for a lithium ion capacitor is preferably a solution prepared by dissolving a lithium salt in a non-aqueous solvent. The concentration of the lithium salt in the non-aqueous electrolyte is, for example, 0.3 to 3 mol/L.

Such lithium salts are salts of $Li^+$ as the cation and the anion. Preferred examples of the anions of lithium salts include anions of fluorine-containing acids, anions of chlorine-containing acids, and bissulfonylimide anions. The lithium salts may be used alone or in combination of two or more thereof.

Examples of the bissulfonylimide anions include bis(fluorosulfonyl)imide anions [such as a bis(fluorosulfonyl)imide anion $(N(SO_2F)_2^-)$], (fluorosulfonyl)(perfluoroalkylsulfonyl)imide anions [such as a (fluorosulfonyl)(trifluoromethylsulfonyl)imide anion $((FSO_2)(CF_3SO_2)N^-)$], and bis(perfluoroalkylsulfonyl)imide anions [such as a bis(trifluoromethanesulfonyl)imide anion $(N(SO_2CF_3)_2^-)$ and a bis(pentafluoroethanesulfonyl)imide anion $(N(SO_2C_2F_5)_2^-)$]. The number of the carbon atoms of such a perfluoroalkyl group is, for example, 1 to 10, preferably 1 to 8, more preferably 1 to 4, in particular, 1, 2, or 3.

Of the bissulfonylimide anions, preferred examples include a bis(fluorosulfonyl)imide anion ($FSI^-$); and bis(perfluoroalkylsulfonyl)imide anions ($PFSI^-$) such as a bis(trifluoromethylsulfonyl)imide anion ($TFSI^-$), a bis(pentafluoroethylsulfonyl)imide anion, and a (fluorosulfonyl)(trifluoromethylsulfonyl)imide anion $((FSO_2)(CF_3SO_2)N^-)$.

The lithium salts are not particularly limited and preferred examples thereof include $LiClO_4$, $LiBF_4$, $LiPF_6$, LiFSI, LiTFSI, and LiPFSI.

The non-aqueous solvent used for a lithium ion capacitor is not particularly limited. However, from the standpoint of ion conductivity, for example, the above-described examples of the organic solvent used for an EDLC may be used.

The non-aqueous solvent used for a lithium ion capacitor may be an ionic liquid or may be a combination of an ionic liquid and the organic solvent. The ionic liquid is a salt that is constituted by a cation and an anion, that has fluidity in the molten state, and that has ion conductivity at least in the molten state. The ionic liquid preferably has fluidity at room temperature.

The cation constituting the ionic liquid can be selected from the above-described cations. Preferred are organic onium cations; in particular, preferred examples include nitrogen-containing organic onium cations (in particular, for example, organic onium cations having a nitrogen-containing heterocycle). In a case where the electrolyte contains such an organic onium cation, the viscosity of the salt can be decreased, which facilitates an increase in the ion conductivity. The ionic liquid may contain one type of the cations or a combination of two or more types of the cations.

Of the nitrogen-containing organic onium cations, preferred are cations each having a 5- or 6-membered heterocycle that has one or two nitrogen atoms as atoms forming the ring (in particular, for example, pyrrolidine or imidazoline). In particular, preferred examples include pyrrolidinium cations having a methyl group and an alkyl group having 2 to 4 carbon atoms such as $MPPY^+$ and $MBPY^+$; and imidazolium cations having a methyl group and an alkyl group having 2 to 4 carbon atoms such as $EMI^+$ and $BMI^+$. From the standpoint of ion conductivity, $EMI^+$ is preferred.

The anion constituting the ionic liquid can be selected from the above-described anions. In particular, preferred examples include fluoroalkanesulfonate anions (such as $CF_3SO_3^-$) and bissulfonylimide anions. Specific examples of the bissulfonylimide anions include the examples of anions constituting the lithium salts; and preferred examples include $FSI^-$, $TFSI^-$, and $PFSI^-$. The ionic liquid may contain one type of the anions or a combination of two or more types of the anions.

Specific examples of the ionic liquid include EMIFSI, EMITFSI, EMIPFSI, MPPYFSI, MPPYTFSI, and MPPYPFSI.

FIG. 1 is a schematic view illustrating an example of the configuration of a capacitor. A cell case 45 contains main components of a capacitor 40 that are an electrode-plate group and an electrolyte. The electrode-plate group is formed by stacking, plural times, a first electrode (positive electrode) 41 and a second electrode (negative electrode) 42 such that the electrodes sandwich a separator 43 therebetween. The positive electrode 41 includes a positive-electrode collector 41a having a three-dimensional network structure and a positive-electrode active material 41b that has the form of particles filling continuous pores of the positive-electrode collector 41a. The negative electrode 42 includes a negative-electrode collector 42a having a three-dimensional network structure and a negative-electrode active material 42b that has the form of particles filling continuous pores of the negative-electrode collector 42a. However, the electrode-plate group is not limited to the stack type and may be formed by rolling up the positive electrode 41 and the negative electrode 42 with the separator 43 therebetween.

Incidentally, in a case where the capacitor is a lithium ion capacitor, in order to prevent lithium from depositing on the negative electrodes 42, as illustrated in FIG. 1, the negative electrodes 42 are desirably formed so as to be larger than the positive electrodes 41.

APPENDIXES

Regarding the above-described embodiments, the following appendixes will be further disclosed.

APPENDIX 1

A capacitor includes a positive electrode containing a positive-electrode active material, a negative electrode containing a negative-electrode active material, a separator disposed between the positive electrode and the negative electrode, and an electrolyte, wherein the positive-electrode active material contains a porous carbon material, in a volume-based pore size distribution of the porous carbon material, a cumulative volume of pores having a pore size of 1 nm or less accounts for 85% or more of a total pore volume, the porous carbon material has a crystallite size of 1 to 10 nm, the porous carbon material contains an oxygen-containing functional group, and a content of the oxygen-containing functional group is 3.3 mol % or less.

In such a capacitor, even in the case of setting the maximum charging voltage to be high, decomposition of the electrolyte can be suppressed and charging and discharging can be performed with stability.

APPENDIX 2

In Appendix 1 above, the porous carbon material preferably has a BET specific surface area of 1000 $m^2$/g or more.

In the capacitor using such a porous carbon material, the capacitance of the positive electrode can be further increased, which is advantageous to increase the capacitance of the capacitor.

APPENDIX 3

In Appendix 1 or Appendix 2 above, an X-ray diffraction pattern of the porous carbon material obtained with Cukα radiation may have a peak: $P_k$ in 2θ=40° to 50° and $P_k$ may contain a component of a peak: $P_{d111}$ attributed to a (111) plane of a diamond crystal. While such a porous carbon material exhibits high electron conductivity, it also has high isotropy of electron conductivity. This is advantageous to obtain a capacitor having a higher current-collecting capability.

APPENDIX 4

In any one of Appendix 1 to Appendix 3 above, in a case where an X-ray diffraction pattern of the porous carbon material obtained with Cukα radiation has a peak: $P_{G002}$ attributed to a (002) plane of graphite, a ratio $I_{G002}/I_k$ of an intensity $I_{G002}$ of $P_{G002}$ to an intensity $I_k$ of $P_k$ is preferably 3.0 or less. In such a porous carbon material, $I_k$ is very high relative to $I_{G002}$ and hence $P_k$ can at least contain the component of $P_{d111}$. Accordingly, the current-collecting capability of the capacitor can be more effectively enhanced.

EXAMPLES

Hereinafter, the present invention will be specifically described with reference to Examples and Comparative examples. However, the present invention is not limited to the following Examples.

Example 1

An EDLC was produced in the following manner.
(1) Production of Positive Electrode A porous carbon material (average particle size: about 10 μm), acetylene black serving as a conductive aid, PVDF (an NMP solution containing 12 mass % of PVDF) serving as a binder, and NMP serving as a dispersion medium were mixed and stirred with a mixer to thereby prepare a positive-electrode mixture slurry. The components in the slurry had the following contents: 28.6 mass % of the porous carbon material, 1.0 mass % of acetylene black, and 27.4 mass % of PVDF.

The positive-electrode mixture slurry was applied to one surface (roughened surface) of the surfaces of an aluminum foil (thickness: 20 μm) serving as a collector with a doctor blade to thereby form a coating film having a thickness of 150 μm and dried at 100° C. for 30 minutes. The dried article was rolled with a pair of rolls to provide a positive electrode having a thickness of 80 μm.

The porous carbon material used for producing the positive electrode was produced in the following manner.

A mixture of activated carbon (average particle size: 20 μm, specific surface area: 80 m²/g) and silicon particles (average particle size: 100 μm) was placed in a rack formed of carbon. The rack was inserted into a nitrogen gas atmosphere within a reaction furnace set at 900° C. Subsequently, the internal temperature of the reaction furnace was increased at a temperature-increase rate of 10° C./min to 1450° C. to melt silicon. In this state, a reaction between activated carbon and silicon was caused for 5 hours. The resultant product was 13-SiC. The obtained SiC was pulverized to provide particles having an average particle size of 10 μm.

The SiC having an average particle size of 10 μm was placed in a rack formed of carbon in an electric furnace having a quartz-glass furnace tube. Within the electric furnace, while chlorine gas was passed at a flow rate of 1000 ml/min and Ar gas was passed at a flow rate of 5000 ml/min, a reaction between SiC and chlorine gas was caused at 1100° C. for 4 hours. At this time, a cold trap set at −20° C. was installed in the exhaust port of the furnace tube; the cold trap was used to liquefy and collect $SiCl_4$. Also, a three-way valve was installed on the exit side of the cold trap and used to return chlorine gas that did not react with SiC within the furnace tube, back to the furnace tube. Subsequently, chlorine gas within the furnace tube was purged with Ar gas and, after the temperature of the carbon rack decreased to 400° C., the porous carbon material left in the rack was taken out into the air. The obtained porous carbon material was used in the production of the positive electrode.

The obtained porous carbon material was subjected to the following evaluations (a) to (e).
(a) X-Ray Diffractometry (XRD)

The X-ray diffraction pattern of the porous carbon material was measured with Cukα radiation.

Figure 2:
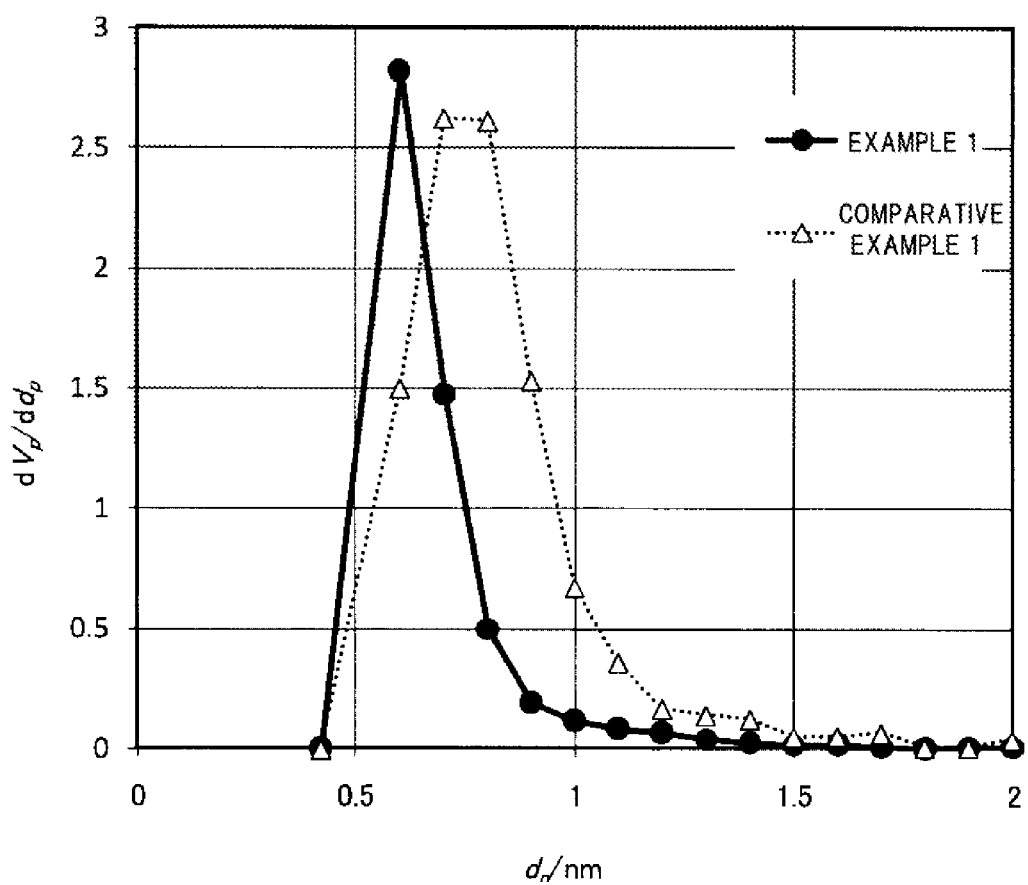
FIG. 2 is a graph illustrating the pore size distributions of a porous carbon material used in Example 1 and activated carbon in Comparative example 1.

In the diffraction pattern, no peak attributed to the (002) plane of graphite and positioned in 2θ=about 20° to about 30° was observed ($I_{G002}/I_k$=0). On the other hand, a broad peak: $P_{d111}$ attributed to the (111) plane of diamond and positioned in 2θ=about 40° to about 50° was observed. The crystallite size was determined from the half width of $P_{d111}$ with the Scherrer equation and it was found to be 2.0 nm.
(b) Pore Size Distribution A volumetric $N_2$ adsorption isotherm measurement was performed at −196° C. with a BELSORP-miniII manufactured by Bel Japan, Inc. Values $dV_p/dd_p$ calculated by differentiating pore volume $V_p$ with respect to pore size $d_p$ were plotted against $d_p$. Thus, the pore size distribution of the porous carbon material was determined. As a result, as illustrated in FIG. 2, the distribution having a monodisperse sharp peak at 0.6 nm was obtained. The cumulative volume of pores having a pore size of 1 nm or less accounted for 90% or more of the total pore volume.

For comparison, another pore distribution was also measured in the above-described manner for a commercially available activated carbon for an EDLC (Comparative example 1, Kansai Coke and Chemicals Company, Limited, MSP-20S). As illustrated in FIG. 2, for Comparative example 1, a broad pore size distribution was observed and the pore size peak was positioned at about 0.8 nm. The cumulative volume of pores having a pore size of 1 nm or less accounted for 84% of the total pore volume.
(c) BET Specific Surface Area A volumetric $N_2$ adsorption isotherm measurement was performed with a BELSORP-miniII manufactured by Bel Japan, Inc. to measure the BET specific surface area of the porous carbon material and it was found to be 1599 m²/g.
(d) Content of Oxygen-Containing Functional Groups The content of oxygen-containing functional groups in the porous carbon material was measured with a full-automatic temperature-programmed desorption spectrometer (TPD-1-ATw, manufactured by Bel Japan, Inc.). A predetermined amount of the porous carbon material was used as a sample. The sample was heated to 150° C. and then degassed for 120 minutes. Continuously, the sample was heated at a temperature-increase rate of 5° C./min under a stream of helium gas (supply rate: 50 ml/min) and gas components released from the sample were analyzed with a quadrupole mass spectrometer. This analysis was carried out for three fragments among gas components released from the sample: $H_2O$ (m=18), CO (m=28), and $CO_2$ (m=44). The result indicated that the porous carbon material contained oxygen-containing functional groups such as a carbonyl group, a carboxyl group, and a hydroxyl group; and the content of the oxygen-containing functional groups was 1.5 mol % relative to 1 g of the porous carbon material.

Incidentally, for comparison, the content of oxygen-containing functional groups was measured in the same manner also for activated carbon in Comparative example 1 and it was found to be 3.3 mol %.

(e) CV Measurement

The produced positive electrode was subjected to a CV measurement with a counter electrode and a reference electrode that were formed of lithium. The electrolyte was a solution containing 1 mol/L of $LiPF_6$ dissolved in a solvent mixture of a volume ratio 1:1 of EC and DEC. The CV measurement was performed with a sweep rate of 5 mV/s.

For comparison, a positive electrode produced in the above-described manner except that the porous carbon material was replaced by the activated carbon in Comparative example 1, was subjected to the CV measurement.

Figure 3:
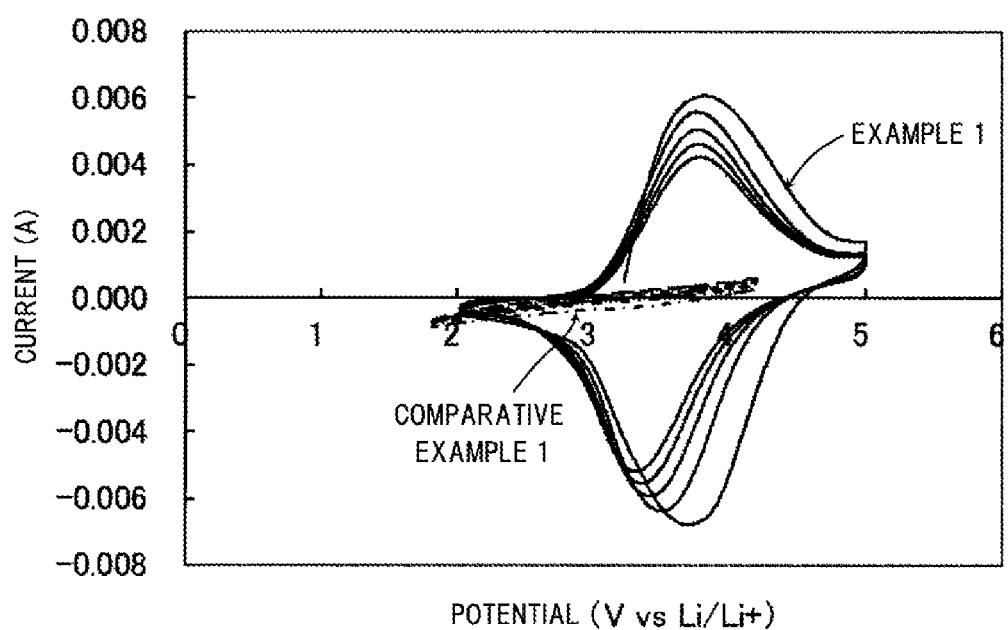
FIG. 3 illustrates cyclic voltammograms of a porous carbon material used in Example 1 and activated carbon in Comparative example 1.

FIG. 3 illustrates the results of the CV measurements. As illustrated in FIG. 3, in Comparative example 1 in which activated carbon was used as the positive-electrode active material, no reversible faradaic capacitance was observed. In contrast, in Example 1 in which the porous carbon material was used, reversible faradaic capacitance was observed at about 3.5 V. This probably indicates that the porous carbon material exhibits, in the interaction with anions, not an EDLC-like behavior, but a behavior of being reversibly intercalated and deintercalated by anions.

(2) Production of Negative Electrode

Activated carbon (Kansai Coke and Chemicals Company, Limited, MSP-20S), acetylene black serving as a conductive aid, PVDF (an NMP solution containing 12 mass % of PVDF) serving as a binder, and NMP serving as a dispersion medium were mixed and stirred with a mixer to thereby prepare a negative-electrode mixture slurry. The components in the slurry had the following contents: 21.5 mass % of activated carbon, 0.76 mass % of acetylene black, and 20.6 mass % of PVDF.

The negative-electrode mixture slurry was applied to one surface (roughened surface) of the surfaces of an aluminum foil (thickness: 20 μm) serving as a collector with a doctor blade to thereby form a coating film having a thickness of 150 μm and dried at 100° C. for 30 minutes. The dried article was rolled with a pair of rolls to provide a negative electrode having a thickness of 95 μm.

(3) Production of EDLC

Each of the positive electrode and the negative electrode obtained in (1) and (2) above was cut so as to have dimensions of 1.5 cm×1.5 cm; and the mixture was removed from a portion extending along a side and having a width of 0.5 mm to form a collector-exposed portion. Aluminum leads were individually welded to the collector-exposed portions of the positive electrode and the negative electrode.

The positive electrode and the negative electrode were laminated such that a cellulose nonwoven fabric (thickness: 60 μm) serving as a separator was disposed between the positive electrode and the negative electrode. Thus, a single-cell electrode-plate group was formed. The obtained electrode-plate group was contained in a cell case formed from an aluminum laminate sheet.

Subsequently, an electrolyte was injected into the cell case to impregnate the positive electrode, the negative electrode, and the separator with the electrolyte. The electrolyte was a propylene carbonate (PC) solution containing 1.5 mol/L of $TEMABF_4$ as a supporting electrolyte. Finally, the cell case was sealed with a vacuum sealer while the pressure was reduced.

In this way, an EDLC was produced.

(4) Evaluation of EDLC

The EDLC obtained in (3) above was charged at a current of 0.4 mA/cm² to a voltage of 2.6 V and discharged to a voltage of 0 V. At this time, changes in the voltage during the final charging stage and the presence or absence of swelling of the cell were observed.

Subsequently, while charging and discharging were performed as above except that the maximum charging voltage was increased to 4.0 V in steps of 0.1 V, the maximum value of charging voltage (maximum charging voltage) at which the increase in the voltage during the final charging stage did not slow down and swelling of the cell was not observed, was determined.

In addition, charging was performed at a current of 0.4 mA/cm² to the maximum voltage and an increase in the voltage during the final charging stage was determined; and discharging was performed to a voltage of 0 V to determine the capacitance (mAh).

Comparative Example 2

An EDLC was produced and evaluated as in Example 1 except that, as the positive electrode, an electrode that was the same as the negative electrode produced in Example 1 was used.

The results of Example 1 and Comparative example 2 are described in Table I. In Table I, the ratio (%) of the cumulative volume of pores having a pore size of 1 nm or less to the total pore volume is represented by $V_{si}$.

TABLE I

| | Positive-electrode active material | | | | | |
|---|---|---|---|---|---|---|
| | Type | $V_{si}$ (%) | Oxygen-containing functional groups (mol %) | Negative-electrode active material | Maximum voltage (V) | Capacitance (mAh) |
| Example 1 | Porous carbon material | ≥90 | 1.5 | Activated carbon | 4.0≤ | 0.30 |
| Comparative example 2 | Activated carbon | 84 | 3.3 | Activated carbon | 2.7 | 0.20 |

As indicated in Table I, in Comparative example 2 in which activated carbon was used as the positive-electrode active material, the maximum charging voltage at which the increase in the voltage during the final charging stage did not slow down and swelling of the cell was not observed, was found to be 2.7 V. And charging to 3.0 V or more resulted in slow down of the increase in the voltage during the final charging stage and considerable swelling of the cell. This is probably because charging to the high voltage causes decomposition of the electrolyte at the surface of activated carbon, resulting in gas generation.

In contrast, in Example 1 in which the porous carbon material was used as the positive-electrode active material, charging even to 4.0 V did not cause slow down of the increase in the voltage during the final charging stage or swelling of the cell. This indicates that decomposition of the electrolyte was considerably suppressed in the EDLC of Example. In addition, the capacitance of the EDLC was increased in Example 1, compared with Comparative example 2.

Example 2

A lithium ion capacitor was produced in the following manner.
(1) Production of Negative Electrode A hard-carbon powder, acetylene black serving as a conductive aid, PVDF (an NMP solution containing 12 mass % of PVDF) serving as a binder, and NMP serving as a dispersion medium were mixed and stirred with a mixer to thereby prepare a negative-electrode mixture slurry. The components in the slurry had the following contents: 28.0 mass % of hard carbon, 2.7 mass % of acetylene black, and 13.3 mass % of PVDF.

The obtained negative-electrode mixture slurry was applied to one of the surfaces of a punched copper foil (thickness: 20 μm, aperture size: 50 μm, aperture ratio: 50%) serving as a collector with a doctor blade to thereby form a coating film having a thickness of 150 μm and dried at 100° C. for 30 minutes. The dried article was rolled with a pair of rolls to provide a negative electrode having a thickness of 95 μm.
(2) Production of Lithium Electrode A lithium foil (thickness: 50 μm) was press-bonded to one of the surfaces of a punched copper foil (thickness: 20 μm, aperture size: 50 μm, aperture ratio: 50%, 2 cm×2 cm) serving as a collector to thereby produce a lithium electrode. A nickel lead was welded to the other surface of the collector.
(3) Production of Lithium Ion Capacitor The positive electrode was produced as in (1) in Example 1. Each of the positive electrode and the negative electrode obtained in (1) above was cut so as to have dimensions of 1.5 cm×1.5 cm and the mixture was removed from a portion extending along a side and having a width of 0.5 mm to form a collector-exposed portion. An aluminum lead was welded to the collector-exposed portion of the positive electrode. A nickel lead was welded to the collector-exposed portion of the negative electrode.

The positive electrode and the negative electrode were laminated such that a cellulose separator (thickness: 60 μm) was disposed between the positive electrode and the negative electrode. Thus, a single-cell electrode-plate group was formed. Furthermore, the lithium electrode obtained in (2) above was placed on the negative electrode of the electrode-plate group with a polyolefin separator (laminate of a polyethylene microporous membrane and a polypropylene microporous membrane) therebetween. The resultant laminate was contained in a cell case formed from an aluminum laminate sheet.

Subsequently, an electrolyte was injected into the cell case to impregnate the positive electrode, the negative electrode, and the separators with the electrolyte. The electrolyte was a solution containing 1.0 mol/L of $LiPF_6$ as a lithium salt dissolved in a solvent mixture of a volume ratio 1:1 of EC and DEC. Finally, the cell case was sealed with a vacuum sealer while the pressure was reduced.

The negative electrode and the lithium electrode were connected outside the cell case through a lead wire. Charging was performed at a current of 0.2 mA/$cm^2$ to 0 V to thereby pre-dope the negative-electrode active material with lithium. Subsequently, discharging was performed at a current of 0.2 mA/$cm^2$ to a voltage of 1 V.

In this way, a lithium ion capacitor was produced.
(4) Evaluation of Lithium Ion Capacitor The lithium ion capacitor obtained in (3) above was charged at a current of 0.4 mA/$cm^2$ to a voltage of 3.8 V and discharged to a voltage of 3.0 V. At this time, changes in the voltage during the final charging stage and the presence or absence of swelling of the cell were observed.

Subsequently, while charging and discharging were performed as above except that the maximum charging voltage was increased to 5.0 V in steps of 0.1 V, the maximum value of charging voltage (maximum charging voltage) at which the increase in the voltage during the final charging stage did not slow down and swelling of the cell was not observed, was determined.

In addition, charging was performed at a current of 0.4 mA/$cm^2$ to the maximum voltage determined above and an increase in the voltage during the final charging stage was determined; and discharging was performed to a voltage of 3.0 V to determine the capacitance (mAh).

Comparative Example 3

A lithium ion capacitor was produced and evaluated as in Example 2 except that, as the positive electrode, an electrode that was the same as the negative electrode produced in Example 1 was used.

The results of Example 2 and Comparative example 3 are described in Table II.

TABLE II

| | Positive-electrode active material | | | | | |
|---|---|---|---|---|---|---|
| | Type | $V_{si}$ (%) | Oxygen-containing functional groups (mol %) | Negative-electrode active material | Maximum voltage (V) | Capacitance (mAh) |
| Example 2 | Porous carbon material | ≥90 | 1.5 | Hard carbon | 5.0≤ | 0.30 |
| Comparative example 3 | Activated carbon | 84 | 3.3 | Hard carbon | 3.8 | 0.12 |

As indicated in Table II, in Comparative example 3 in which activated carbon was used as the positive-electrode active material, the maximum charging voltage at which the increase in the voltage during the final charging stage did not slow down and swelling of the cell was not observed, was found to be 3.8 V. And charging to 4.2 V or more resulted in slow down of the increase in the voltage during the final charging stage and considerable swelling of the cell. This is probably because charging to the high voltage causes decomposition of the electrolyte at the surface of activated carbon, resulting in gas generation.

In contrast, in Example 2 in which the porous carbon material was used as the positive-electrode active material, charging even to 5.0 V did not cause slow down of the increase in the voltage during the final charging stage or swelling of the cell. This indicates that decomposition of the electrolyte was considerably suppressed in the lithium ion capacitor of Example. In addition, the capacitance of the lithium ion capacitor was increased in Example 2, compared with Comparative example 3.

INDUSTRIAL APPLICABILITY

In a capacitor according to an embodiment of the present invention, even in the case of setting the maximum charging voltage to be high, charging and discharging can be performed with stability. Accordingly, an increase in the capacitance can be achieved. Thus, the capacitor can be used for various storage devices required to have a high capacitance.

REFERENCE SIGNS LIST

40: capacitor, 41: positive electrode, 41a: positive-electrode collector, 41b: positive-electrode active material, 42: negative electrode, 42a: negative-electrode collector, 42b: negative-electrode active material, 43: separator, 45: cell case

The invention claimed is:

1. A capacitor comprising a positive electrode containing a positive-electrode active material, a negative electrode containing a negative-electrode active material, a separator disposed between the positive electrode and the negative electrode, and an electrolyte,
   wherein the positive-electrode active material contains a porous carbon material,
   in a volume-based pore size distribution of the porous carbon material, a cumulative volume of pores having a pore size of 1 nm or less accounts for 85% or more of a total pore volume,
   the porous carbon material has a crystallite size of 1 to 10 nm,
   the porous carbon material contains an oxygen-containing functional group, and a content of the oxygen-containing functional group is 3.3 mol % or less,
   wherein, when the X-ray diffraction pattern of the porous carbon material is measured with Cuk$\alpha$ radiation, in the diffraction pattern, no peak attributed to the (002) plane of graphite and positioned in 2$\theta$=20° to 30° is observed ($I_{G002}/I_k$=0).

2. The capacitor according to claim 1, wherein the porous carbon material has a monodisperse pore size peak in the volume-based pore size distribution, and
   the pore size peak is positioned in a range of 0.5 to 0.7 nm.

3. The capacitor according to claim 1, wherein the negative-electrode active material contains at least one selected from the group consisting of activated carbon, graphite, hard carbon, soft carbon, lithium titanium oxide, silicon-containing material, and tin-containing material.

4. Use of the capacitor of claim 1 as a lithium ion capacitor,
   wherein the use comprises a step of charging and discharging the lithium ion capacitor with a maximum voltage of 3.9 to 5.2 V.

5. Use of the capacitor of claim 1 as an electric double layer capacitor,
   wherein the use comprises a step of charging and discharging the electric double layer capacitor with a maximum voltage of 2.8 to 4.2 V.

* * * * *